US00RE36668E

United States Patent [19]

Hixson et al.

[11] E Patent Number: Re. 36,668

[45] Reissued Date of Patent: Apr. 25, 2000

[54] METHOD OF PRODUCING DYED NYLON WALK-OFF MATS HAVING IMPROVED WASHFASTNESS, AND MATS PRODUCED THEREBY

[75] Inventors: Robert R. Hixson, 333 S. Mission Ridge Dr., Rossville, Ga. 30741; David R. Kelly, Dalton, Ga.; Hobert C. Sweatman, Soddy, Tenn.

[73] Assignee: Robert R. Hixson, Rossville, Ga.

[21] Appl. No.: 09/318,041

[22] Filed: May 24, 1999

Related U.S. Patent Documents

Reissue of:

[64] Patent No.: 5,707,469
Issued: Jan. 13, 1998
Appl. No.: 08/613,281
Filed: Mar. 11, 1996

[51] Int. Cl.[7] ..... B32B 5/28; D06P 3/10

[52] U.S. Cl. ..... 156/72; 156/309.9; 8/497; 8/543; 8/549; 8/924; 8/929

[58] Field of Search ..... 156/72, 309.9; 8/494, 497, 543–9, 924, 929; 428/95

[56] References Cited

U.S. PATENT DOCUMENTS

| | | | |
|---|---|---|---|
| 4,871,604 | 10/1989 | Hackler | 156/72 |
| 5,131,914 | 7/1992 | Kelley | 8/449 |
| 5,131,918 | 7/1992 | Kelley | 8/549 |
| 5,198,278 | 3/1993 | Sumimoto et al. | 428/95 |
| 5,445,653 | 8/1995 | Hixson et al. | 8/531 |
| 5,445,860 | 8/1995 | Bova | 428/87 |
| 5,484,455 | 1/1996 | Kelley | 8/539 |

OTHER PUBLICATIONS

"Printing Acid and Cationic Dyeable Nylon With Remalan Dyes" Hoechst Celanese, Mar. 1993, 2 pages.

*Primary Examiner*—Margaret Einsmann
*Attorney, Agent, or Firm*—Chambliss, Bahner & Stophel, P.C.

[57] ABSTRACT

A method of making a dyed nylon walk-off mat having improved washfastness includes dyeing nylon yarn, or a tufted nylon mat, in a fiber reactive dye solution having a pH in the range of about 0.5 to about 2.5. The yarn is then heated, such as by steam, at a temperature above 200° F., after which the yarn is treated with an alkaline solution followed by a heat treatment. A backing, such as of rubber or vinyl, is applied to the mat at an elevated temperature. The application of the backing at elevated temperature, and the heat treatment subsequent to application of the alkaline solution, may be performed simultaneously.

6 Claims, No Drawings

METHOD OF PRODUCING DYED NYLON WALK-OFF MATS HAVING IMPROVED WASHFASTNESS, AND MATS PRODUCED THEREBY

Matter enclosed in heavy brackets [ ] appears in the original patent but forms no part of this reissue specification; matter printed in italics indicates the additions made by reissue.

The manufacture of walk-off mats represents a small but significant part of the carpet industry. These mats are usually made of nylon yarns which are tufted into narrow width rugs. These rugs are then cut into shaped mats and backed with rubber, vinyl, or a like substance.

Such mats are widely used by the hospitality industry, the retail marketing industry, the manufacturing industry, and by homeowners. They are placed in front of doorways or along walkways, and are used to wipe soil from shoes before entering the establishment. Thus, the name "walk-off" mats. Such mats may be cut or shaped in a variety of ways, but customarily range in size from 24 inches by 36 inches to 5 feet by 9 feet. Mat material may also be tufted in 6 foot widths and run in length as long as desired to cover a sidewalk or passageway.

These mats usually carry a backing of rubber, vinyl, or a similar material, the backing adding to the comfort of the mat, as well as providing the mats with a "non-slip" safety feature. Applying the backing to the mat is usually the last manufacturing operation, and is most often carried out at temperatures in the range of 325° F. to 350° F. to insure that the backing adheres firmly to the nylon mat.

Coloring the nylon mats is one of the most important features of their manufacture. Walk-off mats must be colored in a wide range of solid shades and multicolor tones which are aesthetically pleasing to the customer. Dyeing of the nylon yarn can be accomplished in a number of different ways including the following:

(a) solid shade piece dyeing of tufted mat material in a dye beck or other batch dyeing equipment;

(b) solid shade continuous dyeing of tufted mat material;

(c) printing of mat material by engraved screens which apply predetermined multicolor designs;

(d) solid shade continuous dyeing of nylon yarns in warp, coil, or knit form; and (e) space dyeing of the nylon yarns, e.g., a combination of continuous dyeing and overprinting of nylon yarns to provide them with random multicolorations, the multi-color yarns then being tufted into mat material.

Regardless of the dyeing method employed tufted mat material and yarns which are tufted into mats are customarily dyed with acid dyes and premetalized dyes. These dyes offer good lightfastness and crockfastness, and reasonably good washfastness. Mats and yarns are frequently after treated with dye-fixing agents to improve washfastness. Despite these procedures, the washfastness of nylon mats made of yarns dyed with acid and premetalized dyes leaves much to be desired.

In use, nylon walk-off mats receive heavy soiling from foot traffic, especially in inclement weather conditions. For this reason, the mats are frequently subjected to high temperature industrial washing, e.g., at 160° F. and higher, for extended periods, with industrial strength alkaline detergents. These washings have an adverse effect of the useful life of the mats, since even those dyed with the best acid and premetalized dyes, and having the best after treatment with dye-fixing agents, will start to bleed and change color after about five washings, and will be significantly changed in color after about 25 washings. Moreover, these mats are frequently washed together with mats of different colors, so that the dye washing off mats of deep color, such as red, will stain mats dyed to light colors, such as beige.

It is an object of the present invention to provide a method of dyeing nylon walk-off mats, and mats produced thereby, which offer acceptable lightfastness and crockfastness, while dramatically extending the life of the mats by significantly improving their washfastness.

According to the invention, this objective is achieved by dyeing the nylon, either before or after it is tufted into mat material, with selected fiber reactive dyes at a low pH, followed by application of an alkaline solution and heat treatment.

It is another object of the invention to employ the heat conventionally associated with applying the backing material to the mat as a heat treatment for fixing the dye in the yarn.

Fiber reactive dyes have been used successfully in the textile industry since about 1956. These dyes have been widely used to provide excellent washfastness of natural and regenerated fiber, such as cotton, rayon, and wool. These dyes, when applied to the fibers under alkaline conditions at temperature ranging from about 30° C. to 90° C. form covalent bonds with an hydroxy, amino, or mercapto group in the fiber. Covalent bonds are the strongest bonds which can be formed between a dyestuff and a fiber, and these bonds resist breaking under the most severe washing conditions.

Attempts have been made in the past to apply fiber reactive dyes to nylon, but these attempts have generally been unsuccessful, or of limited value. Major problems presented have been instability of the dyes, inconsistency of covalent bond formation, and inability to obtain required lightfastness. Some recent work has been more promising. U.S. Pat. No. 5,131,918 to Kelley describes the application of fiber reactive dyes to nylon styling yarns used to produce multicolor carpeting. However, the Kelley disclosure is directed to color styling, not to washfastness.

U.S. Pat. No. 5,445,653 to Hixson, et. al. is directed to a method of dyeing cationic dyeable and light dyeable nylon yarns so that after these yarns are tufted into a carpet with undyed yarns, the dyed yarns will not bleed into the dye bath and will resist further dyeing and staining by the acid dyes in the dye bath.

The present invention permits several types of fiber reactive dyes to be applied to *light, regular or deep dyeable* nylon walk-off mats regardless of the type of *such* nylon used as the face fiber of the mat. The yarn may, for example, be Type 6 or Type 66 nylon, [may contain any number of available amine groups from 75 $NH_2$ equivalent (deep dye) to zero $NH_2$ equivalent (cationic dyeable),] may be of any denier, and may be heat set or non-heat set prior to dyeing.

Fiber reactive dyes which are useful in the present method include, but are not limited to, monochlorotriazinyl, dichlorotiazinyl, vinyl sulfone, and bifunctional types. An example of a monochlorotriazinyl dye structure is the following:

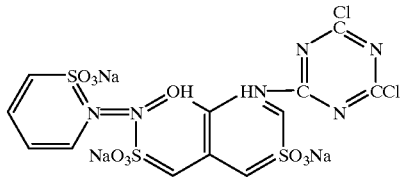

Reactive Red 24

In a vinyl sulfone dye, the nucleophilic substitution occurs with a vinyl sulfone group, as in Dye.$SO_2$.CH=$CH_2$. A bifunctional dye contains both vinyl sulfone and chlorotriazinyl reactive groups.

What these dyes have in common are sulfonic acid groups which will form ionic bonds with the amine groups in the nylon under low pH conditions, and R=X groups capable of forming covalent bonds with the amine groups in the nylon under alkaline conditions when heat is applied.

Other types of fiber reactive dyes, such as chloropyrimidines, chloro- and bromoacetyls, and quinoxalines are available and may be useful in the present invention.

The end use to which a walk-off mat will be put dictates the colorfastness requirements which control dye selection. Dyes used with the present technique must have acceptable washfastness at 160° F., wet and dry crockfastness, and resistance to ultraviolet fading. The latter is thought to be a function of the chromogens used to impart color to the individual dyestuff. These are mostly azo or anthraquinone systems. The azo band is very susceptible to attack by ultraviolet light, so strongly anthraquinone base dyes are thought to give the best lightfastness. Since dye structures are not generally available from dye manufacturers, and are not given in the literature, the best way to determine satisfactory lightfastness is to apply the candidate dye to the nylon substrate and expose the sample in a xenon fadeometer.

Dyes which have been tested and are considered satisfactory for the present purposes are the following:

Remalan Yellow C-3G
Fourtex Yellow 2GR
Fourtex Orange GR
Fourtex Orange RA
Lanasol Scarlet 3G
Fourtex Red 3B
Fourtex Red 6BN
Fourtex Br. Blue KR 150%
Remalan Blue CRB
Lansol Black 2R It is expected that further tests will result in the identification of dyes which can be added to this list.

Fiber reactive dyes may be applied to the nylon yarn with or without previnylization. Previnylization is a process developed to increase the charge on fiber reactive dyes to enhance their reactivity with nylon. Previnylization of the dye is important if the nylon walk-off mat substrate to be dyed is tufted of light dye [or cationic dyeable] nylon. It is not essential if the substrate is formed of regular or deep dyeable nylon. Essentially, the number of amine equivalents available in the nylon for reaction with the dye stuff should determine whether previnylization of the dye is necessary.

The pH of the dye solution is critical. In order to achieve heavy, fully developed shades, the pH must be between 0.5 and 2.5. As the pH increases above 2.5, the color yield correspondingly decreases. Useful light shades can be developed at pH values up to 7.0, but only with considerable dye waste. Sulfamic acid has been found to be ideal for pH adjustment of the dye solution, but any mineral or organic acid will perform with varying degrees of satisaction.

Coloring of the nylon yarns can be accomplished in a number of ways. Nylon yarns can be tufted, prior to dyeing, into the desired width mat material, conventionally 3 feet to 5 feet, and batch or continuous dyed to solid shades. If desired, the solid shade mats can then be over printed with designs, such as by screen printing or computerized spray design printing. Alternatively, prior to tufting, nylon yarns can be continuously dyed to solid shades while, for example, in warp, coil, or knit tubing form. The yarns may also be space dyed with random multicolor effects, such as by spraying, dripping, or printing designs on the yarns. The space printing may be carried out "wet-on-wet" or "wet-on-dry". Such predyed yarns are then tufted into mat material and are ready for the application of a rubber-like backing compound.

Regardless of the dyeing method employed, the mat material or yarns are processed, according to the invention, using the following general dye solution formulations:

For solid shades:

×g/L (grams per liter) preselected fiber reactive dye, which may or may not be previnylized
2.0 to 4.0 g/L thiodiglychol (dye solubilizer)
10.0 to 15.0 g/L Lanawet 690 (non-ionic wetting agent)
×g/L thickener (optional)
×g/L sulfamic acid to adjust pH to 0.5–2.5

For printed or overprint shades (preselected pattern or random):

×g/L preselected fiber reactive dyes, which may or may not be previnylized
2.0 to 5.0 g/L thiodiglychol
×g/L defoamer
×g/L thickener (to desired viscosity)
×g/L sulfamic acid to adjust pH to 0.5–2.5

In general, the method of the present invention is carried out in the following sequence of steps:

A solid shade of dye is applied to the yarn, either before or after tufting into mat material. If dyeing is accomplished by beck or batch dyeing, the yarn should remain in the dye solution for 30 to 45 minutes at a temperature of about 200° F. If the yarn is continuously dyed, such as by spray, pad, or cascade dyeing, the yarn should be nipped so that the dye remains on the yarn at about 80 to 100% wet pick up. If desired, the yarn may also be over printed with shades differing from the solid shade.

Heat is then applied to the yarn to produce a preliminary fixation of the dye. The heat may be provided by steam, in which case the temperature will be 212° F. If dry heat is employed, the temperature will be considerably higher. The heat treatment should last from about one minute, for yarn in warp or coil form, to about 8 minutes for yarn in knitted form. The yarn should be subjected to the heat treatment for the maximum permissible time.

Thereafter, the yarn is washed, such as by spraying or in a wash box.

The yarn is then treated with an alkaline solution. Trisodium phosphate (TSP) has been found to be admirably suitable for this purpose, although many other alkalis will also perform the function. The alkaline solution will have a pH of about 10.5, and may be sprayed on the yarn or applied to the yarn in the last wash box.

Finally, the dye is fixed in the yarn by the application of heat. A dry atmosphere at about 260° F. can be effective, but a temperature of 310° F. to 325° F. is preferred. This heat treatment, subsequent to the alkali application, causes the dye to form covalent bonds with the amine groups in the nylon.

Dry heat in an oven is the preferred method of dye fixation in the present method, but other heat fixation methods will also work. Good results have been obtained by steaming and drying at 260° F. Alternatively, if pre-tufted yarns are being processed, they may be autoclaved at about 275° F. for a normal cycle with good results.

A backing of rubber, vinyl, or like material is applied to the rear surface of the mat material for comfort and non-slip purposes. In applying the back coating, the mat and coating material are typically subjected to dry heat temperatures of 325° F. to 350° F. This heating step can also serve as the heat treatment step following alkaline application to the yarn so as to fix the dye by formation of covalent bonds. However, even if the yarn is subjected to some heat treatment prior to the back coating step, the heat associated with application of the back coating serves as an additional dye fixation heating step.

The following examples further illustrate the present invention:

EXAMPLE 1

3.0 g/L of Fourtex Red 3B was dissolved in water at 190° F. After thorough dissolution, 0.90 g/L of TSP was added and the dye was previnylized by mixing for 10 minutes. The pH of the dye solution was 9.8. The following chemicals were added with agitation:

6.0 g/L guar thickener 2.0 g/L thiodiglychol 13.2 g/L Lanawet 690

12.5 g/L sulfamic acid to pH=1.5

A piece of mat material which had been tufted with 1140 denier 2-ply, heat-set Monsanto type DB-9 (regular dyeable Type 66) nylon was obtained. The thickened dye solution was padded onto the mat material and nipped through a roll at 40 psi pressure. The material was then steamed for 8 minutes, washed in clean water at 140° F. and nipped. The damp material was then soaked in a TSP solution at pH of 10.5 for 30 seconds. The material was again nipped through squeeze rolls and dried for 15 minutes at 320° F. The dried material was dyed to a clear bright bluish-red shade.

A 5.0 gram sample of the dyed material was cut and attached to a 5.0 gram sample of undyed mat material. The samples were placed in a 500 cc beaker containing a test solution as follows:

2.5 g/L Orvus WOB (AATCC standard test detergent)

2.0 g/L TSP 0.5 g/L soda ash

The samples were washed with agitation at 160° F. for 45 minutes. They were then rinsed and dried. The tested sample showed no color change versus an unwashed piece and the sample of undyed material that was washed with the dyed sample showed no stain from washed out dyes.

EXAMPLE 2

The procedure of Example 1 was repeated except that the dye was not previnylized. The chemicals were added direly to the dissolved dyestuff and the pH was adjusted to 1.5.

The dyed sample showed color yield similar to that obtained in Example 1. The test sample showed no color change in the 160° F. Orvus WOB test and the undyed sample showed no stain.

EXAMPLE 3

A quantity of knit tubing was prepared by knitting 1099 denier, 2-ply heat set BASF (regular dye Type 6) nylon. A section of this knitted yarn was dyed continuously by padding through the following dye paste:

13.2 g/l Lanawet 690

2.0 g/L thiodiglychol 6.0 g/L guar thickener 35.0 g/L sulfamic acid 2.4 g/L Fourtex Yellow 2GR 14.4 g/L Fourtex Orange RA 6.6 g/L Fourtex Red 6BN The dyes were previnylized, by adding TSP, at a pH of 9.5 before mixing with the chemicals, at which point the dyes had a pH of 1.0. The dyed knit tubing was nipped to a wet pick-up of 100%.

The solid dyed tubing was then overprinted into a bar pattern by applying the following print pastes at about 30% coverage each:

Paste #1:

0.04 lbs/gallon thiodiglychol 0.05 lbs/gallon guar thickener 0.03 lbs/gallon antifoam 0.29 lbs/gallon sulfamic acid 0.042 lbs/gallon Fourtex Red 6BN 0.11 lbs/gallon Fourtex Orange RA 0.004 lbs/gallon Lanasol Black R Paste #2:

0.04 lbs/gallon thiodiglychol 0.05 lbs/gallon guar thickener 0.03 lbs/gallon antifoam 0.29 lbs/gallon sulfamic acid 0.05 lbs/gallon Fourtex Red 6BN 0.065 lbs/gallon Lanasol Black R Each print paste had a pH of 1.0. After the overprint colors were applied, the tubing was steamed for 8 minutes, rinsed in clear water at 140° F. for 5 minutes, dipped into a TSP solution for 30 seconds, squeezed at 60 psi and dried for 20 minutes at 320° F. The kit tubing was then deknitted and the 1099 2-ply yarn was wound on a tube.

The finished yarn was space dyed to a bright red shade with random spots which were maroon and black. This yarn was subjected to the 160° F. Orvus WOB test as outlined in Example 1. After washing, the dyed yarn showed no loss of color and the undyed yarn washed with it showed no stain.

EXAMPLE 4

A production dye lot of 1140 denier, 2-ply, heat set Monsanto Type DB-9 nylon was knitted into tubing. A quantity of 10,000 pounds was prepared.

The following dyed solutions were prepared:

Solid dye:

0.04 lbs/gallon guar thickener 0.016 lbs/gallon thiodiglychol 0.15 lbs/gallon Lanawet 690

0.29 lbs/gallon sulfamic acid and the following previnylized fiber reactive dyes:

0.006 lbs/gallon Fourtex Yellow 2GR 0.015 lbs/gallon Fourtex Red 6BN 0.0155 lbs/gallon Fourtex Orange RA The dye solution, at a pH of 1.0, was applied continuously to the knit tubing by passing the tubing through a cascading spray. The tubing was then nipped through a roll at 40 psi pressure.

After nipping, the knit tubing was passed through a series of engraved space dye rolls which printed random designs at about 65% total coverage. The following dye pastes were applied by the rolls; all dyes were previnylized before application, and applied at a pH of 1.0:

Rolls C and D:

0.05 lbs/gallon guar thickener 0.04 lbs/gallon thiodiglychol 0.27 lbs/gallon defoamer 0.29 lbs/gallon sulfamic acid 0.084 lbs/gallon Fourtex Red 6BN 0.188 lbs/gallon Fourtex Orange RA 0.012 lbs/gallon Lanasol Black R Rolls E and F:

0.05 lbs/gallon guar thickener 0.04 lbs/gallon thiodiglychol 0.27 lbs/gallon defoamer 0.29 lbs/gallon sulfamic acid 0.052 lbs/gallon Fourtex Red 6BN 0.034 lbs/gallon Fourtex Orange RA After printing, the knit tubing passed directly into a continuous apron atmospheric steamer and steamed for 8 minutes. It then was rinsed under a series of sprayheads which saturated it with clear water at 140° F. The tubing was nipped and run through a wash box containing 0.166 lbs/gallon of TSP.

The tubing was again nipped and passed into a drum dryer which had been preset at 315° F. The dried tubing was deknitted into yarn packages and the final yarn was colored bright red with random dark red and black designs.

The dyed yarns were tufted into 5-foot-wide mat material which was vinyl back coated at 330° F. This material was cut into various size walk-off mats. Several of these mats were tested. They were washed in the 160° F. Orvus WOB test up to twenty cycles with no color change worse than a 4–5 rating on the AATCC gray scale and with zero stain on the undyed material washed at the same time. They also showed a 5 rating (no fade) upon exposure to 80 hours of xenon lightfastness testing.

EXAMPLE 5

The same yarn and same dye formulation were applied on a continuous coil dye line except that the thickener was omitted and the dyes were applied in a computerized spray configuration. This coiled yarn was steamed for two minutes and the TSP solution was applied by spray. Dye fixation was obtained by autoclaving the yarn at 275° F. for 25 minutes. The resultant shade on the yarn was slightly weaker than obtained in Example 4 but was still space dyed to an acceptable bright red/dark red/black shade.

EXAMPLE 6

A roll of tufted mat material, 60 inches wide×120 feet, was obtained. This consisted of undyed 1325 denier, 2-ply, heat set Type DB-9 Monsanto nylon, tufted into a woven polypropylene primary backing.

The following dye paste was prepared:

0.072 lbs/gallon Fourtex Yellow 2GR 0.025 lbs/gallon Fourtex Red 6BN 0.158 lbs/gallon Lanasol Black R The dyes were previnylized by the addition of TSP to a pH of 9.5 for 10 minutes and the following chemicals were added:

0.05 lbs/gallon guar thickener 0.04 lbs/gallon thiodiglychol 0.11 lbs/gallon Nylowet RY 0.25 lbs/gallon sulfamic acid The pH of the thoroughly mixed paste was 1.0 and the viscosity was 300 cps.

The dye paste was applied continuously by cascade to the tufted nylon mat material and the dye permeated material was nipped at 50 psi. The material was then steamed for six minutes in a continuous apron steamer. The material was washed at 160° F. through a series of spray applicators and wash boxes. TSP was applied at a pH of 10.5 in the last wash box and the material was nipped at 50 psi. The material then passed into a drum dryer which had been preset at 210° F. for drying.

The dried material was then backed continuously with a rubber backing and passed though an oven at 325° F. This heat exposure caused the backing to adhere to the mat material and caused covalent bonding to occur between the fiber reactive dyes and the nylon face fiber.

The end result was a dark charcoal gray dyed mat material which was cut up into the desired size finished mats. One of these mats was subjected to 20 washings using the 160° F. Orvus procedure outlined in Example 1. After 20 washings, the mat showed virtually no loss of color and did not stain undyed mat material in any of the 20 washings.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:

1. A method of making a dyed nylon walk-off mat having improved washfastness comprising the steps of:

(a) providing a fiber reactive dye solution having a pH in the range of about 0.5 to about 2.5, (b) applying the dye to *light, regular or deep dyeable* nylon yarn to color the latter, (c) heating the yarn to a temperature above 200° F., (d) contacting the yarn with an alkaline solution, (e) tufting the yarn into a walk-off mat either before [of] *or* after performing steps (b)–(d), (f) applying a heat-responsive, rubber-like backing to the mat, and (g) subjecting the mat and backing to an elevated dry heat temperature, said temperature being high enough to cause the backing to adhere to the mat and also to cause fixation of the fiber reactive dye to the nylon yarn of the mat.

2. A method as defined in claim 1 including the step of washing the yarn after the heating step (c).

3. A method as defined in claim 1 including the step of drying the yarn after contacting the yarn with an alkaline solution.

4. A method as defined in claim 1 wherein the dry heat temperature of step (g) is in the range of 260° F. to 350° F.

5. A method as defined in claim 1 wherein dye fixation is produced by formation of covalent bonds between the fiber reactive dye and the nylon yarn.

6. A method as defined in claim 1 wherein the heating step (c) is accomplished by steaming the yarn.

* * * * *